(12) United States Patent
Kita et al.

(10) Patent No.: US 7,150,287 B2
(45) Date of Patent: Dec. 19, 2006

(54) SAFETY VALVE

(75) Inventors: Toshio Kita, Osaka (JP); Kunihiko Daido, Osaka (JP)

(73) Assignee: Fujikin Incorporated, Osaka (JP)

( * ) Notice: Subject to any disclaimer, the term of this patent is extended or adjusted under 35 U.S.C. 154(b) by 72 days.

(21) Appl. No.: 10/513,794

(22) PCT Filed: Mar. 3, 2004

(86) PCT No.: PCT/JP2004/002645

§ 371 (c)(1),
(2), (4) Date: Nov. 17, 2004

(87) PCT Pub. No.: WO2004/079242

PCT Pub. Date: Sep. 16, 2004

(65) Prior Publication Data

US 2005/0150548 A1    Jul. 14, 2005

(30) Foreign Application Priority Data

Mar. 3, 2003    (JP) ............................. 2003-055073

(51) Int. Cl.
*F16K 17/14* (2006.01)
(52) U.S. Cl. .......................... 137/72; 137/79; 220/89.4
(58) Field of Classification Search .................. 137/72, 137/79; 220/89.4
See application file for complete search history.

(56) References Cited

U.S. PATENT DOCUMENTS

| | | | | |
|---|---|---|---|---|
| 2,950,022 A * | 8/1960 | Boyer | ......................... | 220/261 |
| 3,842,853 A * | 10/1974 | Kelly et al. | ..................... | 137/75 |
| 3,896,835 A * | 7/1975 | Wicke | .......................... | 137/75 |
| 4,069,834 A * | 1/1978 | Bern et al. | ..................... | 137/75 |
| 4,221,231 A * | 9/1980 | Harvey et al. | ................. | 137/72 |
| 4,280,523 A * | 7/1981 | Norton | ......................... | 137/74 |
| 4,290,440 A * | 9/1981 | Sturgis | ......................... | 137/75 |
| 4,727,903 A * | 3/1988 | Sturgis et al. | .............. | 137/461 |
| 5,067,510 A * | 11/1991 | Breaux et al. | ................ | 137/77 |
| 5,511,576 A * | 4/1996 | Borland | ........................ | 137/72 |
| 6,367,499 B1 * | 4/2002 | Taku | ............................ | 137/72 |
| 6,814,097 B1 * | 11/2004 | Girouard | ...................... | 137/72 |

FOREIGN PATENT DOCUMENTS

| | | |
|---|---|---|
| JP | 62-137483 | 6/1987 |
| JP | 02-20873 | 5/1990 |
| JP | 2641940 | 5/1997 |
| JP | 2001-317645 | 11/2001 |

* cited by examiner

*Primary Examiner*—Eric Keasel
*Assistant Examiner*—Craig Price
(74) *Attorney, Agent, or Firm*—Armstrong, Kratz, Quintos, Hanson & Brooks, LLP

(57) ABSTRACT

A safety valve comprises a main body, fixed body, meltable body, movable body, biasing member, movable plug and plug holding means. The fixed body has a small passageway communicating with the interior of a container, and an upper large passageway. The movable plug has a small portion fitting in the upper end of the small passageway of the fixed body, an intermediate portion providing a clearance therearound inside a lower end portion of the large passageway of the fixed body, and a large portion slidably fitting in an intermediate portion of the large passageway of the fixed body. The large rod portion of the movable plug has a passage extending from its upper end to its lower end, and the intermediate portion of the plug is provided with communication passageways having openings in its peripheral surface and communicating with the lower end of the passage.

3 Claims, 2 Drawing Sheets

SAFETY VALVE

TECHNICAL FIELD

The present invention relates to safety valves, and more particularly to a safety valve to be attached to a container for relieving the container of a gas upon a rise in temperature so as to prevent the internal pressure of the container from building up to excess especially in the event of a fire.

BACKGROUND ART

The fuel tank to be installed in motor vehicles wherein natural gas is used as the engine fuel is provided with a safety valve for preventing bursting due to the buildup of the internal pressure of the tank with a rise in the temperature of the tank. The publication of JP-A No. 2001-317645 discloses a safety valve of the type mentioned which comprises a main body, piston (movable body) housed in the main body, meltable alloy filled in a space inside the main body around the piston, and biasing member provided between the piston and the main body. The piston has a passageway extending from one end thereof to the other end thereof, and a first pressure receiving face and a second pressure receiving face at its opposite ends.

Safety valves of the type mentioned are used not only for natural gas tanks but also for hydrogen gas tanks for fuel cell vehicles, so that it has been desired to develop such valves which ensure improved safety.

An object of the present invention is to provide a safety valve of improved safety to be attached to a container for the escape of gas from the container in the event of a rise in temperature.

DISCLOSURE OF THE INVENTION

The present invention provides a safety valve to be attached to a container for relieving the container of a gas in the event of a rise in temperature, the safety valve comprising a hollow cylindrical main body having an inward flange at an upper end thereof, a hollow cylindrical fixed body having a small-diameter portion providing a clearance therearound inside the main body, a large-diameter portion integral with a lower end of the small-diameter portion and closing a lower-end opening of the main body and an attaching portion extending from a lower end of the large-diameter portion and attachable to the container, a meltable body disposed between the small-diameter portion of the fixed body and the main body and having an upper end face in bearing contact with a lower face of the inward flange of the main body, a movable body movably provided between the main body and the small-diameter portion of the fixed body and having an upper end in bearing contact with a lower end of the meltable body, a biasing member provided between the main body and the small-diameter portion of the fixed body and having an upper end in bearing contact with a lower end of the movable body and a lower end bearing on an upper face of the large-diameter portion of the fixed body, a solid cylindrical movable plug having a stepped portion and movably inserted in the fixed body, and plug holding means for preventing the plug from moving upward in a usual state and allowing an upward movement of the plug by a movement of the movable body to an upper position, the safety valve being characterized in that the fixed body has a small axial passageway communicating with interior of the container and a large axial passageway communicating with an upper end of the small axial passageway and having an upper-end opening, the movable plug having a small rod portion fitting in the upper end of the small axial passageway of the fixed body, an intermediate rod portion integral with the small rod portion and providing a clearance therearound inside a lower end portion of the large axial passageway of the fixed body, and a large rod portion integral with the intermediate rod portion and slidably fitting in an intermediate portion of the large axial passageway of the fixed body, the large rod portion of the movable plug having an axial passage extending from an upper end thereof to a lower end thereof, the intermediate rod portion of the movable plug being provided with a communication passageway having openings in a peripheral surface thereof and communicating with a lower end of the axial passage, whereby when the movable body moves to the upper position on melting of the meltable body, the gas is discharged from the container by way of the fixed body small axial passageway, the lower end portion of the fixed body large axial passageway, the plug communication passageway and the plug axial passage.

With the safety valve of the invention, the pressure of the gas in the container is received by the movable plug which is provided inside the fixed body secured to the main body and which is prevented from moving upward by the plug holding means. Since the movable body is free of the internal pressure of the container, the force acting on the meltable body is limited only to the elastic force of the biasing member. This eliminates the erroneous operation of the valve at temperatures lower than the specified level.

The plug holding means may comprises a cavity formed in an outer periphery of the movable plug, a through hole formed in the small-diameter portion of the fixed body so as to assume the same position as the cavity, a ball positionable in both the cavity and the through hole, and a ball recess formed in a lower end portion of the movable body for the ball to move in, the ball recess being positionable as opposed to the through hole when the movable body is brought to the upper position on melting of the meltable body.

In the usual state, the movable plug is prevented by the ball from moving upward, while in the operative state, the ball moves radially outwardly of the plug, allowing the plug to move upward. Despite this simple construction, the plug can be prevented from moving upward in the usual state but is allowed to move upward reliably in the operative state.

Preferably, the cavity in the movable plug is tapered radially inwardly of the plug to flare radially outwardly thereof.

The ball is then reliably movable radially outwardly of the plug, enabling the plug to move upward reliably with the movement of the movable body. The safety valve can therefore be operated reliably under the specified condition.

BEST MODE OF CARRYING OUT THE INVENTION

An embodiment of the present invention will be described below with reference to the drawings. In the following description, the terms "upper," "lower," "left" and "right" refer respectively to the upper and lower sides and left- and right-hand sides of the drawings.

Figure 1:
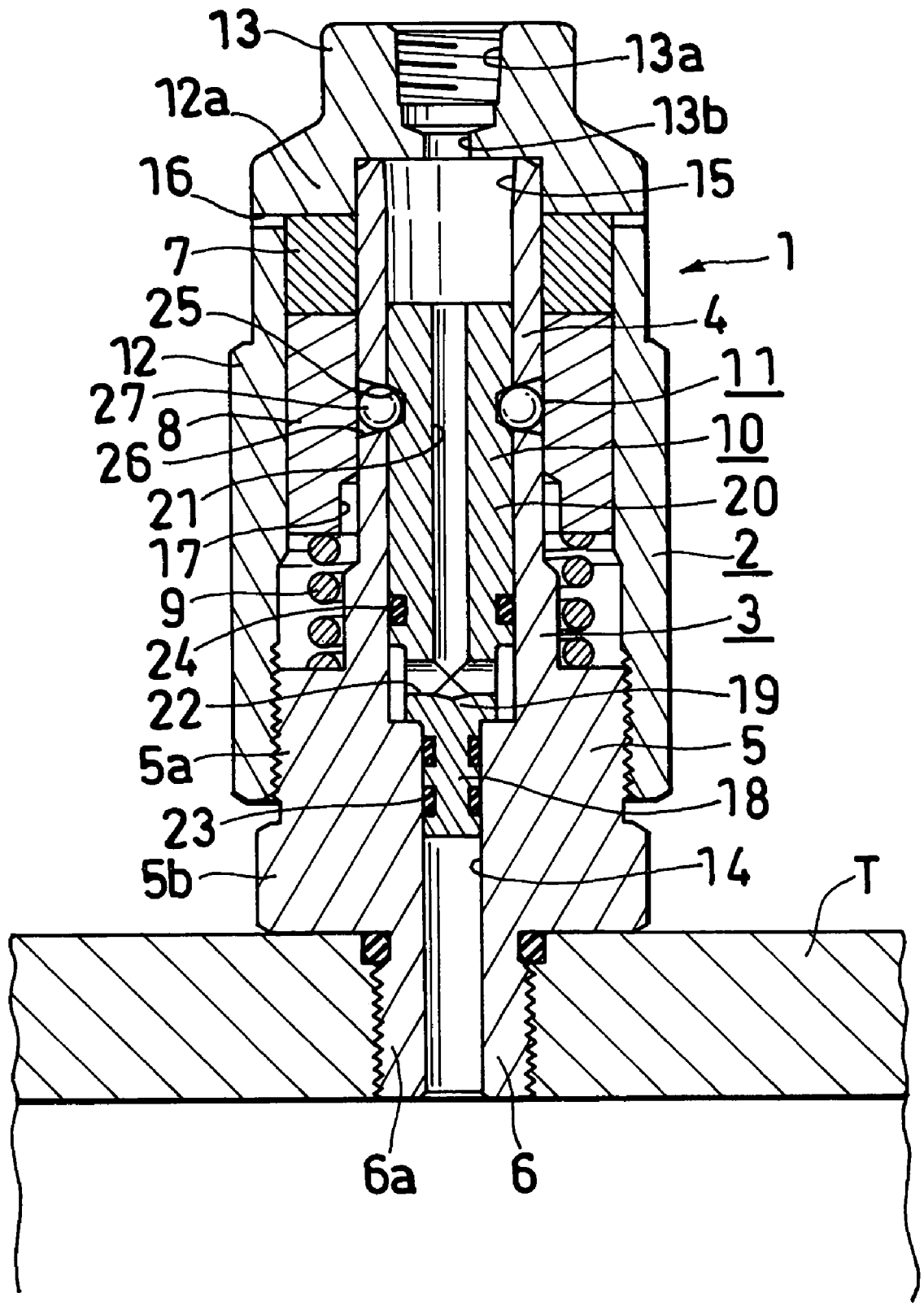
FIG. 1 is a sectional view showing an embodiment of safety valve in the usual state (closed state).
Figure 2:
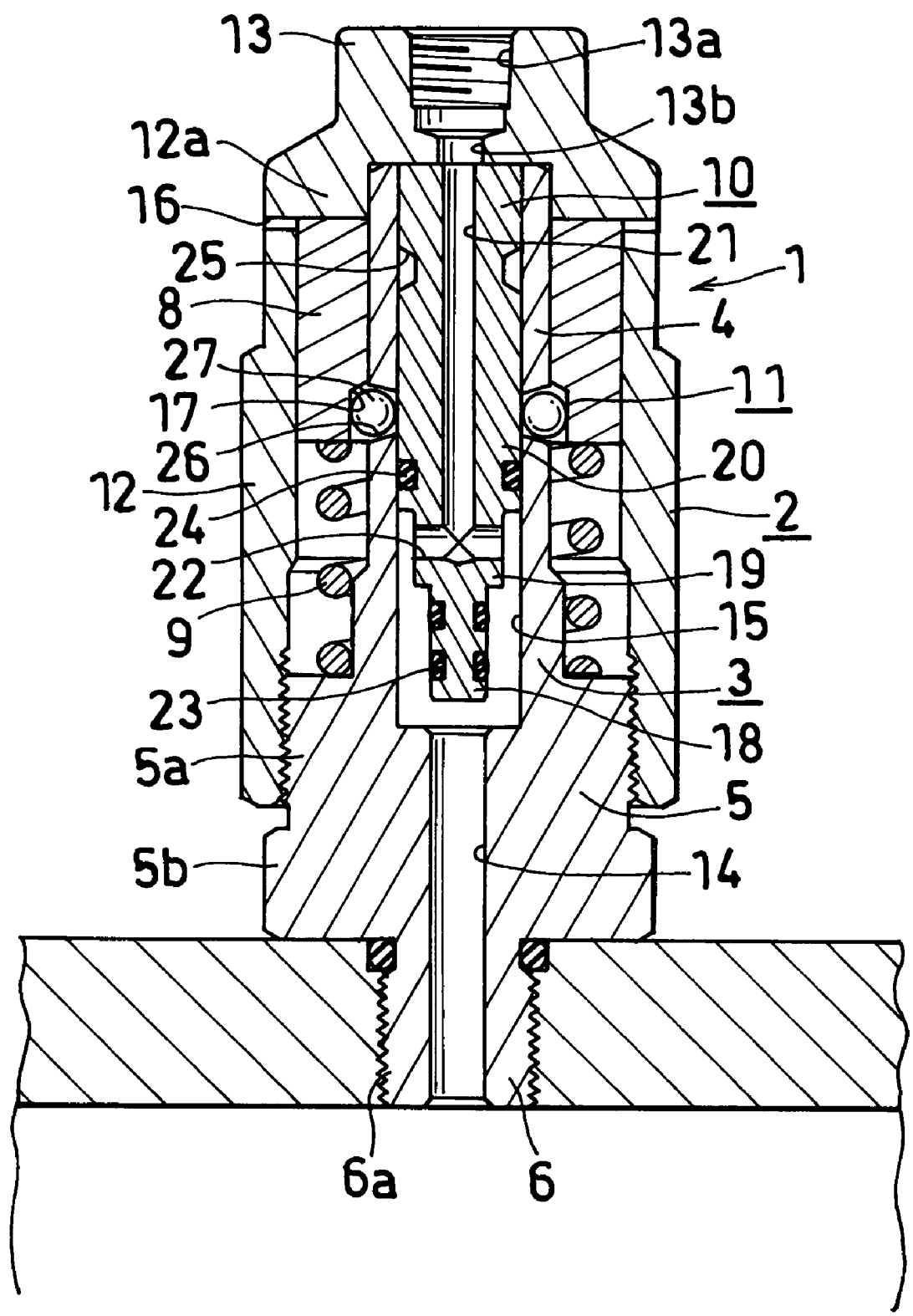
FIG. 2 is a sectional view showing the embodiment of safety valve of the invention in an operative state (open state).

FIGS. 1 and 2 show an embodiment, i.e., a safety valve, of the invention. FIG. 1 shows the safety valve in the usual state wherein the ambient temperature is up to a predetermined value, and the valve channel is closed. FIG. 2 shows the safety valve in an operative state wherein the ambient temperature is over the predetermined value, and the valve channel is open.

With reference to FIG. 1, the safety valve 1 in the usual state comprises a main body 2 in the form of a hollow cylinder and having a peripheral wall 12, a top wall 13 and an inward flange 12a at the upper end of the peripheral wall 12; a hollow cylindrical fixed body 3 having a small-diameter portion 4 providing a clearance therearound inside the main body 2, a large-diameter portion 5 integral with the lower end of the small-diameter portion 4 and closing an opening at the lower end of the main body 2, and an attaching portion 6 extending from the lower end of the large-diameter portion 5 and attachable to a container T; a hollow cylindrical meltable alloy (meltable body) 7 disposed between an upper end portion of the small-diameter portion 4 of the fixed body 3 and an upper end portion of the main body 2 and having an upper end face in bearing contact with the lower face of the inward flange 12a of the main body 2; a hollow cylindrical movable body 8 movably provided between an intermediate portion of the main body 2 and an intermediate portion of the small-diameter portion 4 of the fixed body 3 and having an upper end in bearing contact with the lower end of the meltable alloy 7; a cylindrical coil spring (biasing member) 9 provided between the lower end of the small-diameter portion 4 of the fixed body 3 and a portion of the main body 2 closer to the lower end thereof and having an upper end in bearing contact with the lower end of the movable body 8 and a lower end bearing on the upper face of the large-diameter portion 5 of the fixed body 3; a solid cylindrical movable plug 10 having a stepped portion and movably inserted in the fixed body 3; and plug holding means 11 for preventing the plug 10 from moving upward in the usual state and allowing an upward movement of the plug 10 by a movement of the movable body 8 to an upper position.

The top wall 13 of the main body 2 is provided with an internally threaded portion 13a extending downward from the upper face thereof and a gas vent 13b extending from the threaded portion 13a and having an opening in the lower face of the top wall 13. The internally threaded portion 13a and the gas vent 13b provide a through bore for the escape of a gas from inside the main body 2 to the outside.

The large-diameter portion 5 of the fixed body 3 is externally threaded as at 5a, and the externally threaded portion 5a is screwed into an internally threaded portion formed in the lower end portion of the main body 2, whereby the fixed body 3 is secured to the main body 2. Incidentally, the fixed body 3 may be internally threaded, with an externally threaded portion provided on the main body 2. Alternatively, the fixed body 3 and the main body 2 may be joined together by a method other than screw-thread engagement. The small-diameter portion 4 of the fixed body 3 has an upper end in bearing contact with the lower face of top wall 13 of the main body 2. The large-diameter portion of the fixed body 3 has a flange 5b to be positioned between the lower end of the main body 2 and the outer periphery of the container T. The attaching portion 6 is shaped in conformity with the shape of the safety valve mount portion of the container T. According to the present embodiment, the attaching portion 6 has an externally threaded portion 6a to be screwed into an internally threaded portion formed in an opening of the container T.

The fixed body 3 has an inner periphery of small diameter at a lower portion thereof toward the large-diameter portion 6 and the attaching portion 6, and an inner periphery of large diameter at the other portion toward the small-diameter portion 4. This structure forms in the fixed body a small axial passageway 14 extending from a part of the large-diameter portion 5 which part is close to the upper end thereof to the lower end of the attaching portion 6 and communicating with the interior of the container T, and a large axial passageway 15 communicating with the upper end of the small axial passageway 14 and having an upper-end opening.

The meltable alloy 7, which is known, is adapted to melt when given a predetermined temperature. The peripheral wall 12 of the main body 2 is provided at its upper end with channels 16 for discharging the alloy 7 as melted to the outside therethrough.

The movable body 8 is disposed between the main body 2 and the fixed body 3 so as to be slidable with its inner periphery in contact with the small-diameter portion 4 of the fixed body 3 and with its outer periphery in contact with the inner periphery of the main body 2. The movable body 8 is provided in the inner periphery of its lower end portion with a left and a right ball recess 17 for two balls to move in respectively.

The coil spring 9, acting to bias the movable body 8 upward, discharges the meltable alloy 7 through the alloy discharge channels 16 in the main body 2 and moves the movable body 8 upward when the alloy 7 is melted. In view of the flow characteristics of the alloy 7 at the temperature setting for operating the safety valve 1, the spring 9 is adjusted to a small value of elastic force for moving the movable body upward.

The movable plug 10 has a small rod portion 18 fitting in the upper end of the small axial passageway 14 of the fixed body 3, an intermediate rod portion 19 integral with the small rod portion 14 and providing a clearance therearound inside a lower end portion of the large axial passageway 15 of the fixed body 3, and a large rod portion 20 integral with the intermediate rod portion 19 and slidably fitting in an intermediate portion of the large axial passageway 15 of the fixed body 3.

The large rod portion 20 of the movable plug 10 has an axial passage 21 extending from an upper end thereof to a lower end thereof. The intermediate rod portion 19 of the movable plug 10 is provided with a left or a right communication passageway 22 having openings in a peripheral surface thereof and communicating with the lower end of the axial passage 21. Accordingly, the communication passageways 22 are open to the clearance inside the lower end portion of the large axial passageway 15 of the fixed body 3 around the intermediate rod portion 19.

Provided between the upper end of the large rod portion 20 of the movable plug 10 and the lower face of the top wall 13 of the main body 2 is a predetermined space for permitting an upward movement of the large rod portion 20. This space is greater than the small rod portion 18 in length. Accordingly, when the movable plug 10 is forced upward with the internal gas pressure of the container T, the plug 10 is halted at a position where the upper end thereof comes into contact with the lower face of top wall 13 of the main body 2. At this time, the small axial passageway 14 of the fixed body 3 communicates with the communication passageways 22 of the movable plug 10 through the lower end portion of the large axial passageway 15 in the fixed body 3. Two O-rings 23 are provided around the small rod portion 18 of the plug 10 respectively at upper and lower two locations, while an O-ring 24 is provided also around the large rod portion 20 of the plug 10 at a position above the communication passageways 22.

The plug holding means 11 comprises a left and a right cavity 25 formed in the outer periphery of the movable plug 10 at a portion thereof close to the plug upper end, two through holes 26 formed in the small-diameter portion 4 of the fixed body 3 and each adapted to assume the same position as the corresponding cavity 25, two balls 27 each positionable in both the cavity 25 and the through hole 26, and the aforementioned ball recesses 17 formed in the lower end portion of the movable body 8 for the respective balls 27 to move in.

The cavity 25 in the movable plug 10 and the through hole 26 in the fixed body 3 are tapered radially inwardly of the plug 10 and the fixed body 3, respectively, i.e., flared radially outwardly thereof. The ball recess 17 is so formed as to be positioned as opposed to the corresponding through hole 26 when the movable body 8 is brought to the upper position on melting of the meltable alloy 7. The ball recess 17 has an opening diameter approximately equal to the maximum diameter of the through hole 26, and a bottom diameter slightly smaller than the opening diameter. Although the cavity 25 of the movable plug 10 is preferably so tapered as to flare radially outwardly of the plug, the through hole 26 of the fixed body 3 may be cylindrical.

The movement of the ball 27 with respect to the radial direction of the plug 10 is restrained by the bottom face of the cavity 25 of the plug 10 and the inner peripheral surface of the movable body 8. Accordingly, when an upward force acts on the movable plug 10, an obliquely upward force is exerted on the ball 27 by the lower face defining the cavity 25 of the plug 10, and the upper face defining the through hole 25 of the fixed body 3 exerts an obliquely downward force on the ball 27 against this force, hence the two forces are in balance. In the usual state, the ball 27, therefore, the movable plug 10, is thus prevented from moving upward.

By virtue of the ball recess 17, the movable plug 10 is allowed to move upward by an upward movement of the movable body 8. Stated more specifically, when the movable body 8 moves to the upper position, each ball recess 17 is positioned as opposed to the outer-end opening of the through hole 26 of the fixed body 3, and the ball 27, which has been restrained from moving radially outward by the inner periphery of the movable body 8, is rendered movable radially outward. Because the cavity 25 of the movable plug 10 is tapered and further because the ball 27 is subjected to a radially outward component of force, the ball 27 readily moves toward this direction. Consequently, the ball 27 moves out of the cavity 25 of the plug 10 and is received in both the through hole 26 and the ball recess 17, freeing the plug 10 from the restraint on the upward movement. The plug 10 will move upward in this state if the internal gas pressure of the container is in excess of the frictional force of the plug 10. Thus, the upward movement of the movable body 8 is immediately followed by the upward movement of the plug 10.

When the ambient temperature of the safety valve 1 is in excess of a predetermined value, the meltable alloy 7 melts, bringing the safety valve 1 into an operative state. With the safety valve 1 in this operative state, the alloy 7 has disappeared as discharged through the alloy discharge channels 16 as shown in FIG. 2, and by being biased by the coil spring 9, the movable body 8 is brought to the upper position, in which the upper end of the movable body 8 is in bearing contact with the lower face of the flange 12a. Upon the movable body 8 moving to the upper position, the movable plug 10, which is no longer restrained from moving upward as described above, also moves to an upper position, wherein the upper end of the plug is in contact with the lower face of the tap wall 13 of the main body 2. The small rod portion 18 of the plug 10 closing the small axial passageway 14 is consequently pushed into the large axial passageway 15, whereby a vent channel is formed in the safety valve 1 for the escape of the gas from inside the container T. Stated more specifically, when the movable body 8 moves to the upper position upon the melting of the alloy 7, the gas within the container T is discharged from the through bores 13a, 13b formed in the top wall 13 of the main body 2 by way of the fixed boy small axial passageway 14, lower end portion of the fixed body large axial passageway 15, plug communication passageways 22 and plug axial passage 21.

Each of the pairs of left and right hollow portions or other components 16, 17, 22, 25, 26, 27 need not always be two in number as provided at the left and right, such portions may be provided also on the unillustrated front side and rear side of the drawings. Such portions of each kind may be arranged at three locations as equidistantly spaced along the circumferential direction.

INDUSTRIAL APPLICABILITY

The safety valve of the invention is used on fuel tanks to be installed in motor vehicles wherein, for example, natural gas or hydrogen gas serves as the engine fuel, for relieving the tank of the gas in the event of a rise in the temperature of the tank, thus contributing to improved safety.

The invention claimed is:

1. A safety valve to be attached to a container for relieving the container of a gas in the event of a rise in temperature, the safety valve comprising a hollow cylindrical main body having an inward flange at an upper end thereof, a hollow cylindrical fixed body having a small-diameter portion providing a clearance therearound inside the main body, a large-diameter portion integral with a lower end of the small-diameter portion and closing a lower-end opening of the main body and an attaching portion extending from a lower end of the large-diameter portion and attachable to the container, a meltable body disposed between the small-diameter portion of the fixed body and the main body and having an upper end face in bearing contact with a lower face of the inward flange of the main body, a movable body movably provided between the main body and the small-diameter portion of the fixed body and having an upper end in bearing contact with a lower end of the meltable body, a biasing member provided between the main body and the small-diameter portion of the fixed body and having an upper end in bearing contact with a lower end of the movable body and a lower end bearing on an upper face of the large-diameter portion of the fixed body, a solid cylindrical retained movable plug having a stepped portion and movably inserted in the fixed body, and plug holding means for preventing the plug from moving upward in a usual state and allowing an upward movement of the plug by a movement of the movable body to an upper position, the safety valve being characterized in that the fixed body has a small axial passageway communicating with interior of the container and a large axial passageway communicating with an upper end of the small axial passageway and having an upper-end opening, the movable plug having a small rod portion fitting in the upper end of the small axial passageway of the fixed body, an intermediate rod portion integral with the small rod portion and providing a clearance therearound inside a lower end portion of the large axial passageway of the fixed body, and a large rod portion integral with the intermediate rod portion and slidably fitting in an intermediate portion of the large axial passageway of the fixed body, the large rod portion of the movable plug having an axial passage extending from an upper end thereof to a lower end thereof, the intermediate rod portion of the movable plug being provided with a communication passageway having openings in a peripheral surface thereof and communicating with a lower end of the axial passage, whereby when the movable body moves to the upper position on melting of the meltable body, the gas is discharged from the container by way of the fixed body small axial passageway, the lower end portion of the fixed body large axial passageway, the plug communication passageway and the plug axial passage.

2. A safety valve according to claim 1 wherein the plug holding means comprises a cavity formed in an outer periphery of the movable plug, a through hole formed in the small-diameter portion of the fixed body so as to assume the same position as the cavity, a ball positionable in both the cavity and the through hole, and a ball recess formed in a lower end portion of the movable body for the ball to move in, the ball recess being positionable as opposed to the through hole when the movable body is brought to the upper position on melting of the meltable body.

3. A safety valve according to claim 2 wherein the cavity in the movable plug is tapered radially inwardly of the plug to flare radially outwardly thereof.

* * * * *